United States Patent [19]

Hasegawa et al.

[11] Patent Number: 5,406,062
[45] Date of Patent: Apr. 11, 1995

[54] SENSITIVITY ADJUSTMENT CIRCUIT FOR BAR CODE SCANNER AND METHOD THEREFOR

[75] Inventors: Kazuo Hasegawa; Junichi Ouchi, both of Furukawa, Japan

[73] Assignee: Alps Electric Co., Ltd., Tokyo, Japan

[21] Appl. No.: 93,837

[22] Filed: Jul. 19, 1993

[30] Foreign Application Priority Data

Jul. 31, 1992 [JP] Japan .................................. 4-205617
Aug. 26, 1992 [JP] Japan .................................. 4-227302

[51] Int. Cl.⁶ ............................................. G06K 7/10
[52] U.S. Cl. .................................. 235/462; 235/463; 235/472; 235/455
[58] Field of Search ............... 235/455, 462, 463, 472

[56] References Cited

U.S. PATENT DOCUMENTS

4,020,357  4/1977  Punis .............................. 235/462 X
4,373,114  2/1983  Herbst ............................ 235/455 X
4,528,444  7/1985  Hara et al. .

Primary Examiner—Harold Pitts
Attorney, Agent, or Firm—Guy W. Shoup; Patrick T. Bever

[57] ABSTRACT

After serial signals output from a CCD sensor are amplified, a peak value of white levels corresponding to the space portions of bar codes is held by a peak hold circuit, and then the held peak value is converted into a digital value by an analog-to-digital conversion circuit. The value obtained by multiplying accumulation time data from the CCD sensor by the target value of the white level peak value is divided by the digital value. The next accumulation time of the CCD sensor is set on the basis of the result of this division. In this way, the sensitivity of the scanner is adjusted.

7 Claims, 6 Drawing Sheets

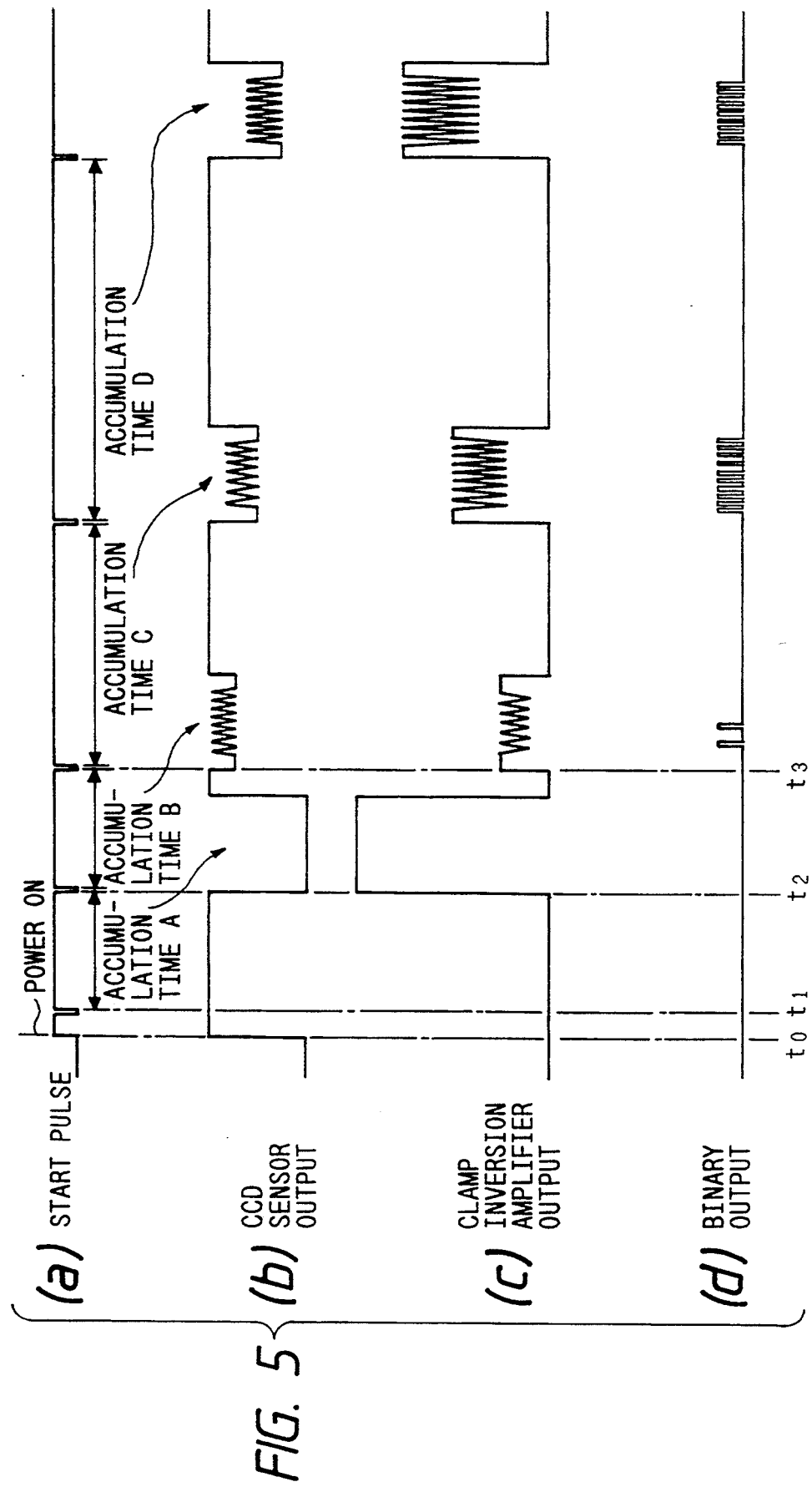

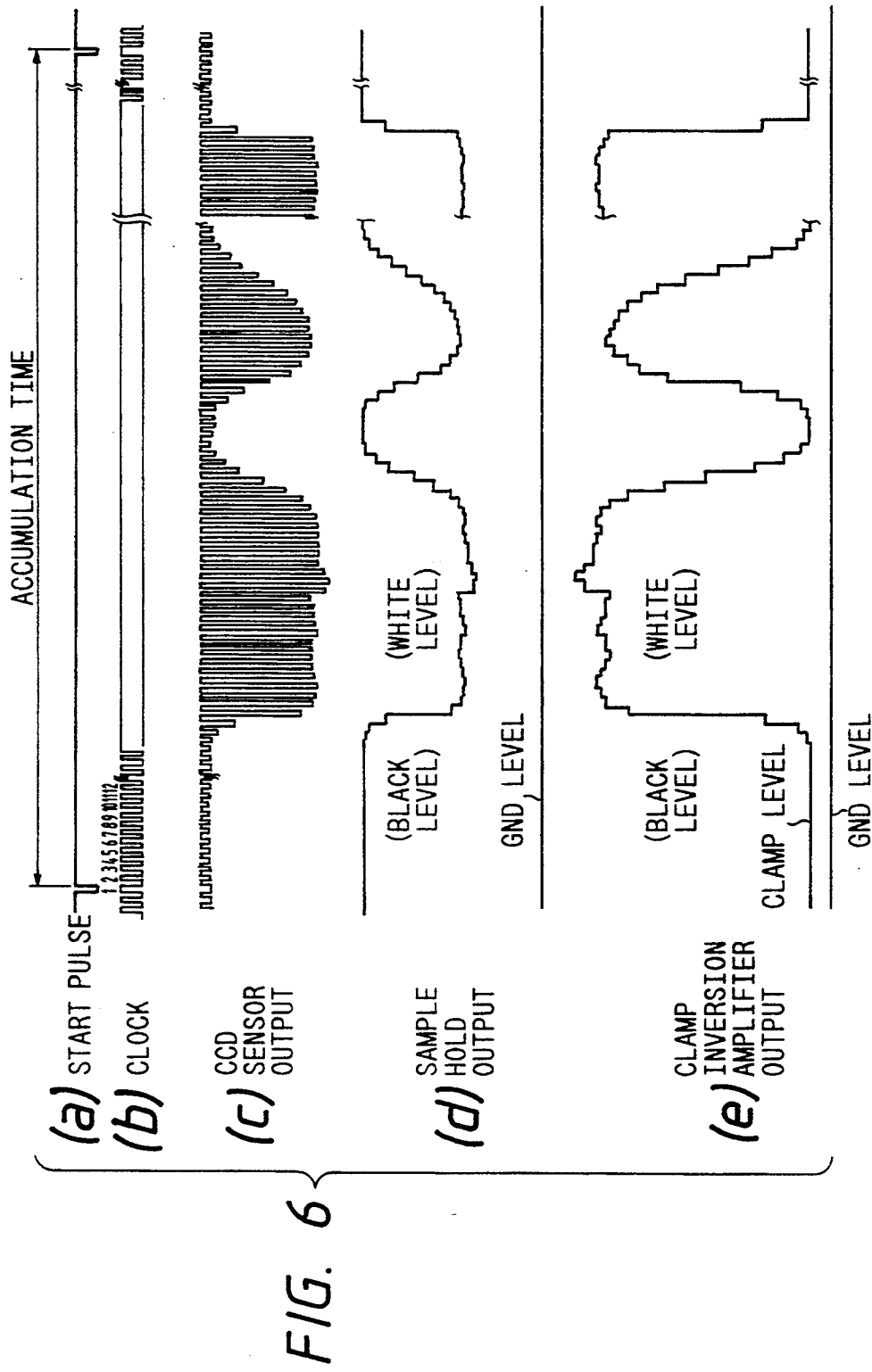

SENSITIVITY ADJUSTMENT CIRCUIT FOR BAR CODE SCANNER AND METHOD THEREFOR

BACKGROUND OF THE INVENTION

1. Field of the Invention

The present invention relates to a bar code scanner for reading bar codes. More particularly, the present invention relates to a sensitivity adjustment circuit suitable for a touch type bar code scanner.

2. Description of the Related Art

A line type sensor is generally used in a touch type bar code scanner. A CCD sensor is a typical example of a line type sensor. This line type CCD sensor comprises a photoelectric conversion section in which a great number of photodiodes, which are photoreceptors, are arrayed linearly; a section for storing the charge of each photodiode; and a charge transfer section formed of CCDs in steps, the number corresponding to the number of photodiodes. The photoelectric conversion section converts light entering from outside into an amount of charge corresponding to the amount of light. The charge storing section temporarily stores the charge obtained by the photoelectric conversion section and transfers it all at once to the charge transfer section when a start pulse is applied. The charge transfer section transfers the charge transferred from the charge storing section step by step each time a clock pulse is applied, and causes the CCD sensor to output timed serial signals.

In this case, the amplitude value of the serial signals obtained by the CCD sensor corresponds to the amount of charge stored in the charge storing section.. The amount of charge depends on the amount of time from when a start pulse is applied until the next start pulse is applied, namely, the so-called accumulation time.

When the photoreception sensitivity of the CCD sensor is fixed, the amplitude of the serial signals is influenced by the environment in which the CCD sensor is used, for example, by the density of colors of the printed bar codes, the light reflectance of the paper surface on which the bar codes are printed, ambient brightness, and the bar code reading distance.

On the other hand, after the serial signals are amplified, they are binarized. When the amplitude of the serial signals is too large, it is impossible to correctly binarize the signals because they are saturated when amplified. When the amplitude of the serial signals is too small, a proper threshold level cannot be obtained at the time of binarization, making it impossible to correctly binarize the signals in the same manner as above.

Therefore, to correctly binarize the serial signals, in practice, it is necessary to properly adjust the photoreception sensitivity of the CCD sensor in accordance with the amplitude value of the serial signals according to the environment in which the CCD sensor is used.

The sensitivity adjustment circuit for a conventional bar code scanner will be explained below with reference to the block diagram shown in FIG. 4.

An LED array 1 has a construction in which a plurality of LEDs (light-emitting diodes) are arrayed linearly. The LED array 1 projects red light to a bar code 3. An LED drive circuit 2 drives the LED array at a constant current, and a CCD sensor 4 scans and detects light reflected from the bar code 3, and converts the light into serial electrical signals. A start circuit 5 actuates the various sections of the bar code scanner in response to a start signal and stops them in response to a reset signal.

An amplification circuit 6 clamps serial signals from the CCD sensor 4 to invert and amplify the signals. A binarization circuit 7 converts the inverted and amplified serial signals into digital binary signals. A clock signal generating circuit 8 supplies an operation clock signal to the various sections and supplies a sensor clock signal, in which the frequency of the clock signal is divided, to the CCD sensor 4. A decoding count counter 9 counts the number of times in which a decode NG signal occurs, such signal occurring when decoding is impossible by a decoding circuit 17.

An accumulation time memory 10 stores a plurality of sensor clock values corresponding to the accumulation time of the CCD sensor 4 in such a manner as to correspond to respective addresses. An accumulation time comparison circuit 11 compares the sensor clock value of the accumulation time memory 10 with the count value of an accumulation time counter 12, outputs a pulse signal when the value of the former becomes greater than that of the latter, and at the same time supplies a reset signal to the accumulation time counter 12 so as to reset the accumulation time count value. The accumulation time counter 12 counts sensor clock signals from the clock signal generating circuit 8. A timing signal generating circuit 13 generates a start pulse in response to a pulse signal from the accumulation time comparison circuit 11. A decoding count comparison circuit 14 compares the decoding count value of the decoding count counter 9 with the value of a set value memory 15. When these values are the same, a termination signal is generated from the number of decodings comparison circuit 14. The set value memory 15 stores constant values corresponding to the number of decodings. An address decoder 16 selects one of the stored values of the accumulation time memory 10 on the basis of the decoding count value of the decoding count counter 9. A decoding circuit 17 measures the pulse width of the digital signals binarized by the binarization circuit 7 in order to decode the signals into characters or numeric data corresponding to the pulse width combinations. The decoding circuit 17 supplies the characters or numeric data to a microcomputer 18 and outputs a decode NG signal when decoding fails. The microcomputer 18 controls the operation of the various sections of the bar code scanner, and an OR gate 19 supplies a reset signal to the start circuit 5.

The operation of the sensitivity adjustment circuit for the bar code scanner constructed as described above will now be explained with reference to FIG. 5. For reference, an example of the signals of the various sections of the bar code scanner within one accumulation time in FIG. 5 is shown in FIG. 6.

FIG. 5 is a signal waveform chart illustrating an example of the signals of the various sections of the bar code scanner when sensitivity adjustment is performed. FIG. 5(a) illustrates a start pulse; FIG. 5(b) illustrates a serial signal output from the CCD sensor 4; FIG. 5(c) illustrates a clamped/inverted and amplified output signal; and FIG. 5 (d) illustrates a binarized output signal.

FIG. 6 is a signal waveform chart illustrating an example of the signals of the various sections of the bar code scanner within one accumulation time. FIG. 6(a) illustrates a start pulse; FIG. 6(b) illustrates a clock signal; FIG. 6(c) illustrates a Serial signal output from the CCD sensor 4; FIG. 6(c) illustrates a sample hold output of the serial signal; and FIG. 6(e) illustrates a clamped/inverted and amplified output signal.

When the bar code scanner is powered on at time $t_0$, the microcomputer 18 supplies a start signal to the start circuit 5. Thereupon, the start circuit 5 sends out a set signal to initialize the various sections of the bar code scanner and place them in an operating state. In this condition, the clock signal generating circuit 8 sends out an operation clock signal to the various sections of the bar code scanner and supplies a sensor clock signal to the CCD sensor 4 and the accumulation time counter 12.

The number of decodings counter 9 supplies an initial value (e.g., 0) of the decoding count value to the address decoder 16 where the address of an accumulation time memory A10, corresponding to the initial value (e.g., 0), is set. The accumulation time memory A10 supplies a value (e.g., 100) corresponding to the set address, to the accumulation time comparison circuit 11. The accumulation time counter 12 counts input sensor clock signals, and supplies the sensor count value to the accumulation time comparison circuit 11. The accumulation time comparison circuit 11, upon detecting that the accumulation time count value of the accumulation time counter 12 has exceeded the value (e.g., 100) corresponding to the address, supplies a pulse signal to the timing signal generating circuit 13 and a reset signal to the accumulation time counter 12. At this time, the timing signal generating circuit 13, in response to the pulse signal, supplies the first start pulse (FIG. 5(a)) to the CCD sensor 4. At the same time, the accumulation time count value of the accumulation time counter 12 up to that time is reset by the reset signal, and the accumulation time counter 12 starts to count sensor clock signals.

When the first start pulse is applied to the CCD sensor 4 at time $t_1$, the CCD sensor 4 reads reflected light from the bar code 3 and outputs serial signals (FIG. 5(b)). After these serial signals are clamped/inverted and amplified by the amplification circuit 6 (FIG. 5(c)), the signals are converted into digital signals (FIG. 5(d)) by the binarization circuit 7, and sent out to the decoding circuit 17. As the serial signals obtained by the reading of the bar code 3 are those signals when the charge storing section of the CCD sensor 4 is not charged from time $t_0$ to time $t_1$, the amplitude thereof is very small and meaningless. Therefore, the decoding circuit 17 cannot decode the serial signals into proper characters or numerical data, and generates only a decode NG signal. Next, the decode NG signal is supplied to the number of decodings counter 9 where the decoding count value is increased by one (e.g., to 1).

Hereinafter, when the number of decodings counter 9 outputs the decoding count value (e.g., 1), the address decoder 16 sets the address of the accumulation time memory A10 corresponding to the decoding count value, the accumulation time memory A10 supplying a value (e.g., 2,500) corresponding to the set address to the accumulation time comparison circuit 11. Next, when the accumulation time comparison circuit 11 detects that the sensor count value of the sensor clock signal in the accumulation time counter 12 has exceeded the value (e.g., 2,500) corresponding to the address, the accumulation time comparison circuit 11 supplies a pulse signal to the timing signal generating circuit 13 and a reset signal to the accumulation time counter 12. Also, in this case, the timing signal generating circuit 13 supplies a second start pulse to the CCD sensor 4 in response to the pulse signal. The accumulation time count value of the accumulation time counter 12 is reset by the reset signal, and again the accumulation time counter 12 starts to count sensor clock signals.

When the second start pulse is applied to the CCD sensor 4 at time $t_2$, serial signals output from the CCD sensor 4 pass through the amplification circuit 6 and the binarization circuit 7 in the same manner as described above, sent out as digital signals to the decoding circuit 17 where the signals are decoded. At the above time, the serial signals are obtained by reading the bar code 3 in the accumulation time A from time $t_1$ to time $t_2$. Because the charge stored up to that time in the charge storing section of the CCD sensor 4 is discharged in the accumulation time A, the amplitude thereof is very small and meaningless. This time also, the decoding circuit 17 cannot decode the serial signals into proper characters or numerical data, and generates only a decode NG signal. Next, this decode NG signal is supplied again to the decoding count counter 9, and the decoding count value of the decoding count counter 9 is further increased by one (e.g., to 2).

The operation to be performed hereinafter is the same as that described above. The decoding count value (e.g., 2) of the number of decodings counter 9 is output. The address of the accumulation time memory A10, corresponding to the decoding count value (e.g., 2) of the address decoder 16, is set. A value (e.g., 2,500) corresponding to the set address in the accumulation time memory A10 is supplied to the accumulation time comparison circuit 11. A pulse signal and a reset signal are generated from the accumulation time comparison circuit 11 when the accumulated time comparison circuit 11 detects that the count value of the sensor clock signal of the accumulated time counter 12 has exceeded the value (e.g., 2,500) corresponding to the set address. A third start pulse is generated from the timing signal generating circuit 13 in accordance with the pulse signal. The accumulation time count value of the accumulated time counter 12 is reset in accordance with the reset signal.

When the third start pulse is applied to the CCD sensor 4 at time $t_3$, serial signals output from the CCD sensor 4 pass through the amplification circuit 6 and the binarization circuit 7, and are sent out to the decoding circuit 17 as digital signals in the same manner as described above. In this case, the serial signals obtained at this time by reading the bar code 3 are those signals in accumulation time B from time $t_2$ to time $t_3$. Even though the bar code 3 has been read normally, the decoding circuit 17 cannot decode the serial signals into normal characters or numerical data also at this time as the setting of the photoreception sensitivity of the CCD sensor 4 is still insufficient and the amplitude thereof is very small, and instead this circuit generates only a decode NG signal in the same manner as above. Next, the decode NG signal obtained at this point is supplied again to the number of decodings counter 9 where the decoding count value is increased by one (e.g., to 3).

Hereinafter in the same manner as described above, each time a decode NG signal is generated from the decoding circuit 17, the count value of the number of decodings counter 9 is increased by one. The sensor count value of the sensor clock signal in the accumulation time counter 12 is changed in accordance with an increase in the decoding count value. The accumulation time of the CCD sensor 4 is changed to accumulation time C or D shown in FIG. 5.

When a normal (optimum) decode signal is produced in the output of the decoding circuit 17, no decode NG signal is generated from the decoding circuit 17, and the decoding count value of the number of decodings counter 9 is kept at a count value the same as the preceding value. Hereinafter, the accumulation time of the CCD sensor 4 is kept at the accumulation time corresponding to the accumulation time count value. In this way, the adjustment of the photoreception sensitivity of the CCD sensor 4 is completed.

The number of times that the decoding count value of the number of decodings counter 9 can be changed in accordance with the decode NG signal from the decoding circuit 17 is limited to a number of times determined by the set number (e.g., 20) of the set value memory, for example, 20 times. When the adjustment of the photoreception sensitivity of the CCD sensor 4 is not completed even if the decoding count value has been changed 20 times, the number of decodings comparison circuit 14 generates a termination signal. This termination signal is supplied as a reset signal to the start circuit 5 through the OR gate 19, the start circuit 5 stopping the operation of the various sections of the bar code scanner and placing them in a waiting state.

In the above-described sensitivity adjustment circuit for the bar code scanner, a method is employed in which the accumulation time of the CCD sensor 4 is varied slightly each time the decode NG signal is supplied to adjust the bar code scanner to the optimum sensitivity. Therefore, it is usual that the number of times the above-mentioned scannings are performed increases by the time the optimum sensitivity adjustment is performed, and thus a longer time has to pass before it becomes possible to actually read the bar code 3. As a result, a problem arises, for example, the user of the bar code scanner is made irritable or uneasy.

In addition, it is impossible in this type of bar code scanner to set the accumulation time of the CCD sensor 4 to be a time shorter than the time it takes for the CCD sensor 4 to read the bar code 3. To read the bar code quickly, the above reading time must be shortened. For this purpose, a method is available in which the Clock signal frequency is made high to shorten the accumulation time of the CCD sensor 4. In practice, however, the clock signal frequency cannot be made so high due to limitations on the operation of the CCD sensor 4, on the response speed of other circuits in use and the like.

Therefore, a problem arises, for example, a sensitivity adjustment range sufficient for a bar code scanner cannot be obtained.

SUMMARY OF THE INVENTION

It is an object of the present invention to provide a sensitivity adjustment circuit for a bar code scanner, which is capable of adjusting the bar code scanner to the optimum sensitivity by scanning a bar code a small number of times.

It is another object of the present invention to provide a sensitivity adjustment circuit for a bar code scanner, which circuit is capable of obtaining a satisfactory sensitivity adjustment range, which has a small number of parts, and which can be constructed at a low cost.

According to a first aspect of the present invention, after serial signals output from a CCD sensor are amplified, a peak value of white levels corresponding to the space portions of a bar code is held by a peak hold circuit, and then the held peak value is converted into a digital value by an analog-to-digital conversion circuit. A predetermined division operation is performed using the digital value. The next accumulation time of the CCD sensor is set on the basis of the result of this division. In this way, the sensitivity of the scanner is adjusted.

According to a second aspect of the present invention, each of the addresses of an accumulation time memory and an illumination time memory is set to correspond to the number of decode NG signals produced in the output of a signal processing circuit, values obtained by the above-mentioned setting being output from these memories. A first comparison circuit (an accumulation time comparison circuit) compares the set value of the accumulation time memory with the count value of the sensor clock signals counted by the accumulation time counter. If these set values are the same, the first comparison circuit supplies a pulse signal to a first time setting circuit (a timing signal generating circuit). A second comparison circuit (an illumination time comparison circuit) compares the set value of the illumination time memory with the count value of the sensor clock signals counted by the accumulation time counter. If these set values are the same, the second comparison circuit supplies a second pulse signal to a second time setting circuit (a timing signal generating circuit. The timing signal generating circuit, upon the pulse signal being applied to the CCD sensor 4, supplies a start pulse signal to the CCD sensor 4 in order to determine the accumulation time of the CCD sensor 4. Also, upon the second pulse signal being applied to the CCD sensor 4, the generation of an illumination signal supplied to the LED drive circuit is stopped so as to stop the lighting of the LED array for illuminating a bar code.

The above and further objects and novel features of the invention will be more apparent from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a signal waveform chart illustrating an example of signals of various sections when sensitivity adjustment is performed in the sensitivity adjustment circuit shown in FIG. 4; and FIG. 6 is a signal waveform chart illustrating an example of signals of various sections within one accumulation time of the signal waveform chart shown in FIG. 5.

DETAILED DESCRIPTION OF THE PREFERRED EMBODIMENTS

Embodiments of the present invention will be explained below with reference to the accompanying drawings.

Figure 4:
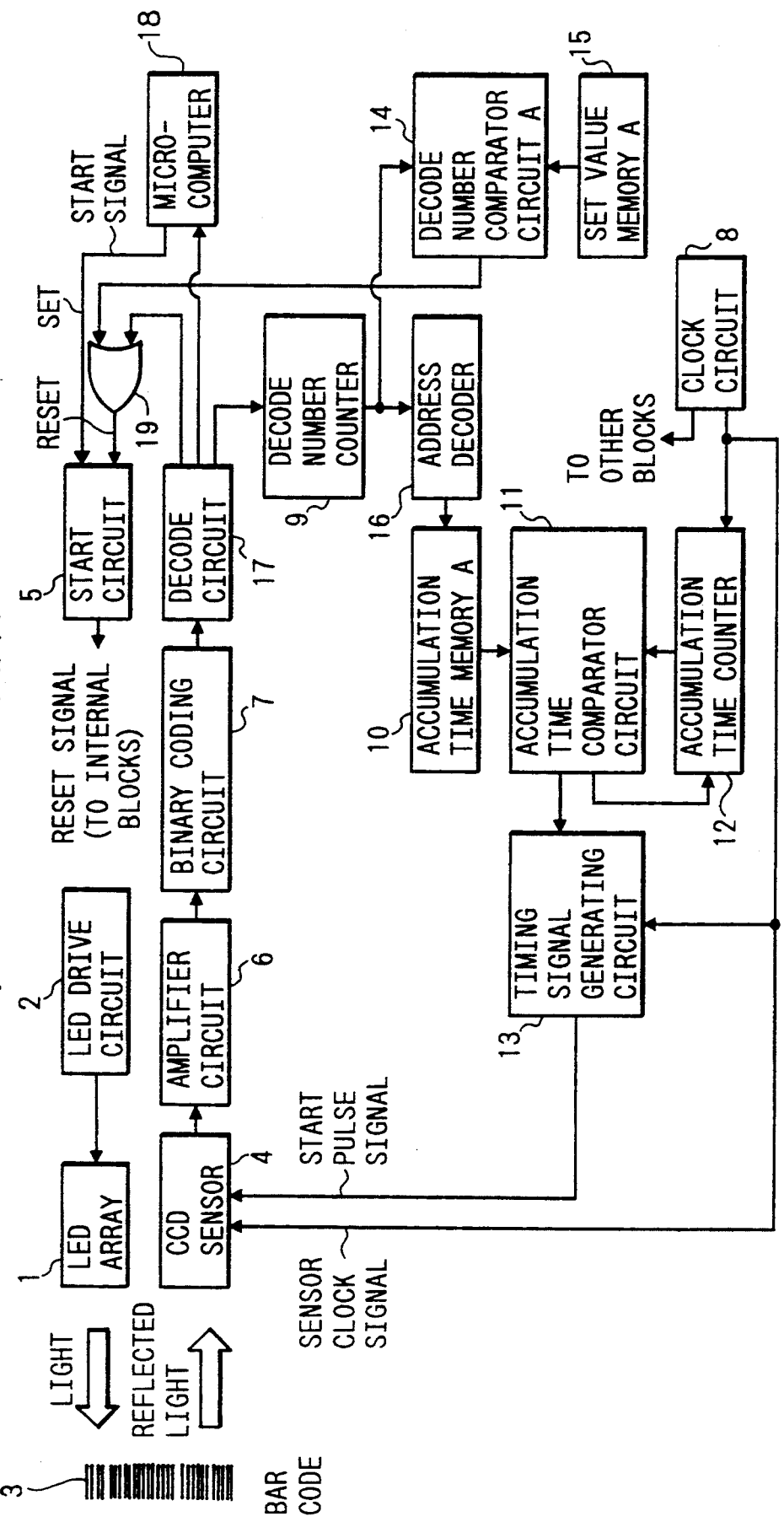
FIG. 4 is block diagram illustrating a conventional sensitivity adjustment circuit for a bar code scanner.

A first embodiment of the present invention will now be explained with reference to FIGS. 1 and 2. Components in FIGS. 1 and 2 which are the same as in FIGS. 4 and 5 are given the same reference numerals.

Figure 1:
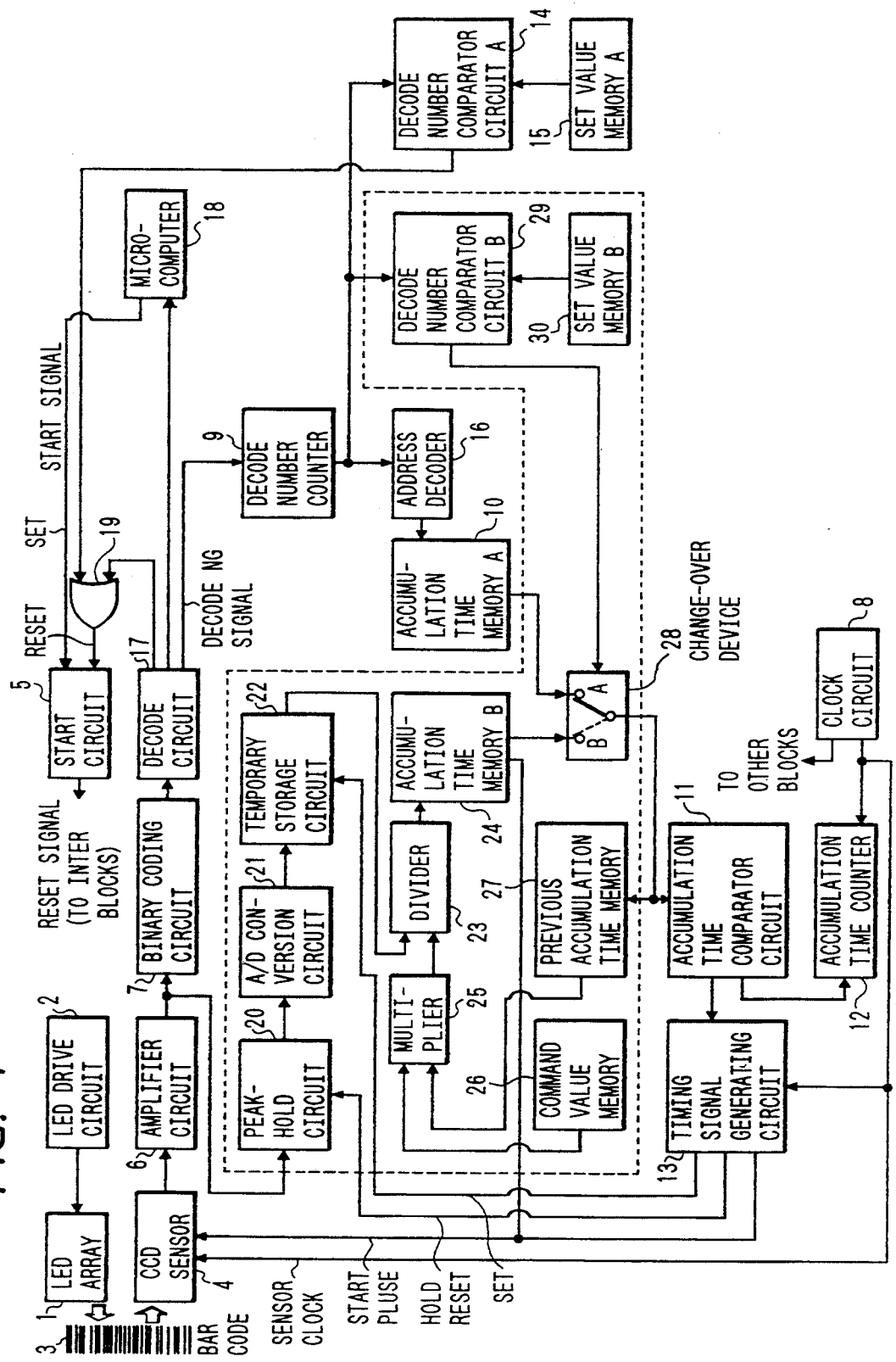
FIG. 1 is a block diagram of a sensitivity adjustment circuit for a bar code scanner in accordance with a first embodiment of the present invention.

As shown in FIG. 1, the first embodiment of the present invention, in addition to the conventional components, comprises a peak hold circuit 20; an analog to digital (A/D) conversion circuit 21; a temporary storage circuit 22; a divider 23; an accumulation time memory 24; a multiplier 25; a target value memory 26; a previous accumulation time memory 27; a change-over device 28; a number of decodings comparison circuit 29; and a set value memory B30.

In this embodiment, the peak hold circuit 20 holds a peak value of a white level signal (hereinafter referred to as a white level peak value) corresponding to the space portions of a bar code from among serial signals produced in the output of the amplification circuit 6. The A/D conversion circuit 21 converts a white level peak value held by the peak hold circuit 20 into a digital value, for example, a digital value $D_{21}$ with a resolution of 8 bits. The temporary storage circuit 22 temporarily stores the digital value $D_{21}$ of the white level peak obtained by the A/D conversion circuit 21. The target value memory 26 stores a target value of the white level peak value as a digital value $D_{26}$. The previous accumulation time memory 27 stores the previous accumulation time in such a manner that this accumulation time corresponds to a count value $D_{27}$ of the sensor clock signal. The multiplier 25 multiplies the digital value $D_{26}$ stored in the target value memory 26 by the count value $D_{27}$ held by the previous accumulation time memory 27, and outputs the result of the multiplication (a digital value $D_{25}$) to the divider 23. The divider 23 divides the digital value $D_{25}$ output from the multiplier 25 by the digital value $D_{21}$ stored in the temporary storage circuit 22, and outputs the result of the division (a digital value $D_{23}$) to the accumulation time memory 24, where the digital value $D_{23}$ from the divider 23 is stored. The number of decodings comparison circuit 29 supplies a change-over signal to the change-over device 28 when a count value $D_9$ of the number of decodings counter 9 becomes greater than a set value $D_{30}$ stored in the set value memory B30. The change-over device 28, which is connected to a terminal A which is in an initialized state, is switched to be connected to a terminal B when the change-over signal is supplied from the number of decodings comparison circuit 29.

The operation of the sensitivity adjustment circuit of this embodiment will be explained below, with reference to the signal waveform chart of FIG. 2.

Figure 2:
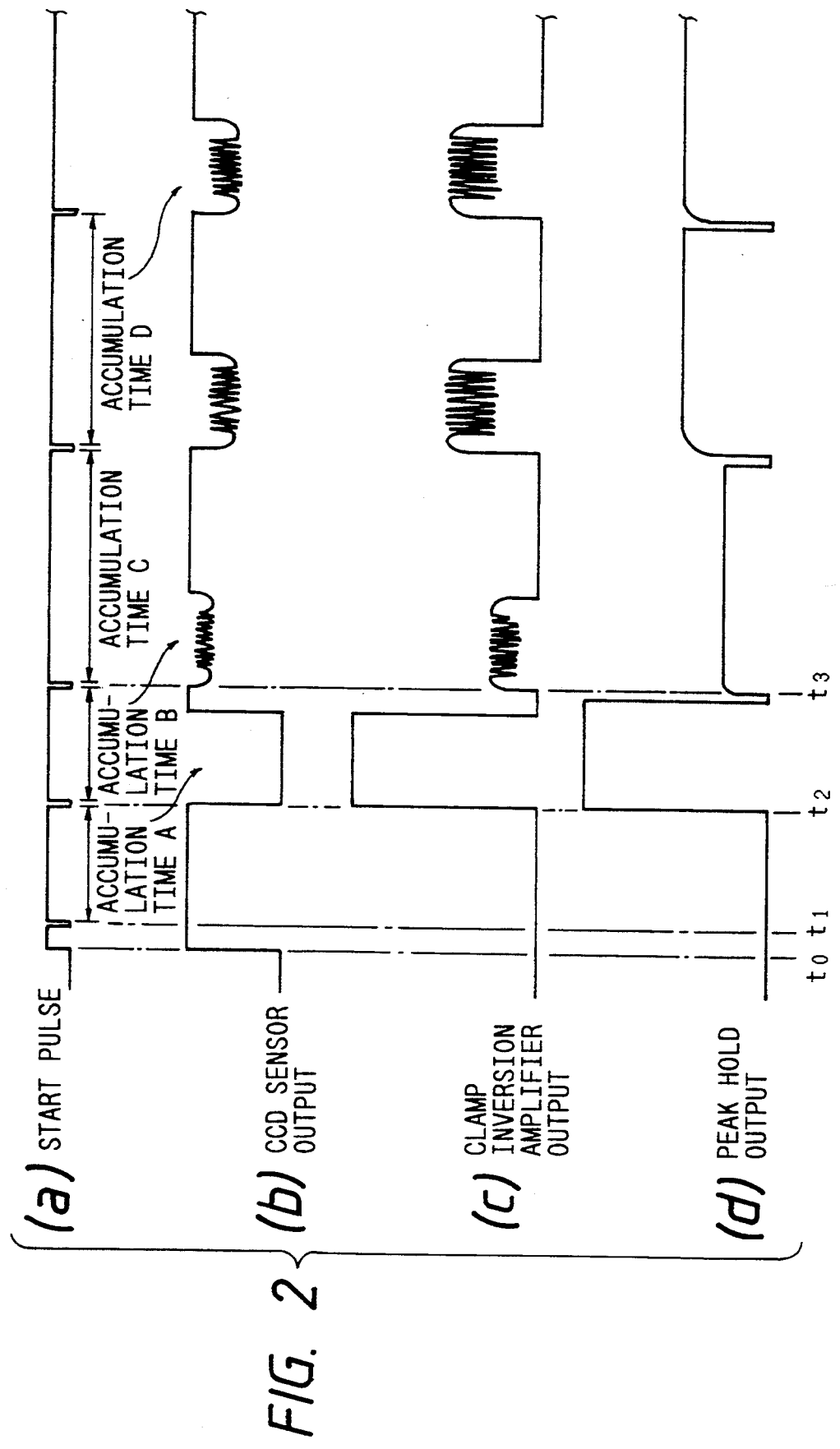
FIG. 2 is a signal waveform chart illustrating an example of actual signals of the various sections of the bar code scanner when sensitivity adjustment is performed in the sensitivity adjustment circuit shown in FIG. 1.

FIG. 2 is a signal waveform chart illustrating an example of actual signals of the various sections of the bar code scanner when sensitivity adjustment is performed. FIG. 2(a) illustrates a start pulse; FIG. 2(b) illustrates a serial signal, which is an output from the CCD sensor 4; FIG. 2(c) illustrates a clamp/inverted and amplified output signal of the serial signal; and FIG. 2(d) illustrates a peak hold output signal of the peak hold circuit 20.

An explanation of the operations shown in FIG. 4 which are the same as those in the prior art is omitted for the sake of convenience. The following explanation will focus on the operation which is characteristic of the sensitivity adjustment circuit.

Initially, each time a serial signal (FIG. 2(b)) is output from the CCD sensor 4 by reading the bar code 3, the serial signal which is clamped/inverted and amplified by the amplification circuit 6 is supplied to the peak hold circuit 20 where a peak value (a white level peak value (FIG. 2(d)), from among the serial signals, of the portions corresponding to the space portions of the bar code is held. Next, the white level peak value is converted by the A/D conversion circuit 21 into the digital value $D_{21}$ indicating the white level peak value. The digital value $D_{21}$ is temporarily stored in the temporary storage circuit 22.

On the other hand, a digital value $D_{10}$ of the accumulation time memory A10, obtained immediately before, is always stored in the previous accumulation time memory 27. The digital value $D_{26}$ of the white level peak, read out from the target value memory 26, is multiplied by the digital value $D_{10}$ read out from the previous accumulation time memory 27, by the multiplier 25, the multiplied digital value $D_{25}$ thus being obtained. The multiplied digital value $D_{25}$ is divided by the digital value $D_{21}$ read out from the temporary storage circuit 22 by the divider 23. The digital value $D_{23}$ thus obtained is temporarily stored in an accumulation time memory B24.

The number of decodings comparison circuit 29 compares the count value $D_9$ (indicating the number of decode NG signals supplied) in the number of decodings counter 9 with the set value $D_{30}$ of the set value memory B30. If the count value $D_9$ indicating the number of decode NG signals supplied exceeds the set value $D_{30}$ of the set value memory B30, a change-over signal is supplied to the change-over device 28. The contact point of the change-over device 28, which point has been connected up to the present time because the change-over signal was supplied thereto, is switched from terminal A to terminal B. The digital value $D_{23}$ stored in the accumulation time memory B24 is supplied to the accumulated time comparison circuit 11 and the previous accumulation time memory 27 in response to the above switching of the contact point, causing the stored contents thereof to be updated.

In this above case, when the accumulated time comparison circuit 11 detects that a count value $D_{12}$ of the sensor clock signal of the accumulated time counter 12 has exceeded a value corresponding to the digital value $D_{23}$, the accumulated time comparison circuit 11 generates a pulse signal and a reset signal. The pulse signal from among these signals is sent out to the timing signal generating circuit 13, the timing signal generating circuit 13 then supplying a start pulse to the CCD sensor 4, and at the same time supplying a hold reset signal to the peak hold circuit 20 in order to release the hold state thereof. Furthermore, the timing signal generating circuit 13 supplies a set signal to the temporary storage circuit 22 to delete the stored contents thereof. The reset signal is supplied to the accumulation time counter 12 to reset the count value thereof.

Next, the CCD sensor 4 reads the bar code 3 again upon the supplying of the start pulse, and outputs serial signals. After these serial signals are clamped/inverted and amplified by the amplification circuit 6, they are supplied to the peak hold circuit 20 where a white level peak value is obtained. Next, the white level peak value is converted into the digital value $D_{21}$ indicating the white level peak by the A/D conversion circuit 21, the digital value $D_{21}$ being temporarily stored in the temporary storage circuit 22.

Since, at this time, the digital value $D_{23}$ read out from the accumulation time memory B24 has been stored in the previous accumulation time memory 27, a target value $D_{26}$ of the white level peak read out from the target value memory 26 is multiplied by the digital value $D_{23}$ read out from the accumulation time memory B24 by the multiplier 25, and thus the digital value $D_{25}$ is obtained. Next, as a result of dividing the multiplied digital value $D_{25}$ from the multiplier 25 by the digital value $D_{21}$ read out from the temporary storage circuit 22, the digital value $D_{23}$ which has been updated is obtained. The updated digital value $D_{23}$ is temporarily stored in the accumulation time memory B24.

Hereinafter, the updated digital value $D_{23}$ stored in the accumulation time memory B24 is supplied to the accumulation time comparison circuit 11 and the previous accumulation time memory 27 through the changeover device 28, causing the stored contents thereof to be updated. Thereafter, the above-described operations are repeatedly performed until a proper (optimum) decoded signal is produced in the output of the decoding circuit 17.

When the proper (optimum) decoded signal is produced in the output of the decoding circuit 17 during the series of the operations, there will, thereafter, be hardly any change in the hold output of the peak hold circuit 20, and the digital value $D_{23}$ stored in the previous accumulation time memory 27 will not be updated. As a result, the digital value $D_{23}$ stored in the accumulation time memory B24 will not be updated. Consequently, the count value $D_{12}$ of the sensor clock signal of the accumulation time counter 12 becomes constant. Hereinafter, the accumulation time of the CCD sensor 4 is kept at an accumulation time corresponding to the count value $D_{12}$. As a result, the adjustment of the CCD sensor 4 to the photoreception sensitivity corresponding to the accumulation time is completed.

Next, the reason why sensitivity can be converged to a target value by the computational operation executed in this embodiment will be explained using numeric values.

The computational operation executed in this embodiment is as shown in equation (1):

$$Tn = (Dt \times Tg)/Dm \quad (1)$$

where Tn is the accumulation time data of the CCD sensor 4, which is newly set, Dt is the target value data of the target value memory 26, Tg is the accumulation time data of the previous accumulation time memory 27, and Dm is the data after the white level peak value stored in the temporary storage circuit 22 has been converted from analog to digital form.

In equation (1), if it is assumed that, for example, the input range of the white level peak value of the A/D conversion circuit 21 is 0 to 5V, the resolution of the white level peak value is 8 bits and the target value of the white level peak is 2.5V, the target value Dm of the target value memory 26 becomes 128. The frequency of the sensor clock signal at this time is assumed to be 250-kHz (4 μsec is one sensor clock signal).

If it is assumed that the white level peak value obtained by the most recent scanning by the CCD sensor 4 is 1.25V (data Dm obtained by the A/D conversion is 64), and the accumulation time of the CCD sensor 4 at this time is 20 msec (Tg=data corresponding to 5,000 sensor clock signals), the following relation is obtained from equation (1):

$$(128 \times 5,000)/64 = 640,000/64 = 10,000.$$

Thus, the next accumulation time corresponds to 10,000 sensor clock signals (40 msec).

Next, when the white level peak value of the serial signals of the CCD sensor 4 is, on the basis of the above accumulation time, 2.3V (Din=117) when the bar code is read again, and if it is assumed that the accumulation time of the CCD sensor 4 is 40 msec (Tg=10,000), the following relation similar to that described above is obtained from equation (1):

$$(128 \times 10,000)/117 = 1,280,000/117 = 10,940.$$

Thus, the next accumulation time is adjusted so as to correspond to 10,940 sensor clock signals (43.76 msec).

Next, if it is assumed that the white level peak value of the serial signals of the CCD sensor 4 obtained by the scanning of the CCD sensor 4 upon the supplying of the next start pulse is 2.53V (Dm=130) at this time, and the accumulation time of the CCD sensor 4 at this time is 43,76 msec (Tg=10,940), the following relation similar to that described above is obtained from equation (1):

$$(128 \times 10,940)/130 = 1,400,320/130 = 10,771.$$

Thus, the next accumulation time corresponds to 10,771 sensor clock signals (43.084 msec).

In this way, after the accumulation time of the CCD sensor 4 is quickly converged to a value close to the target value in accordance with the above-described computation, the target value is gradually converged to the target value until a proper decoded output can be obtained from the decoding circuit 17. Therefore, it is possible to converge the accumulation time to the target value in a shorter time than that in the conventional sensitivity adjustment. Thus, the sensitivity adjustment of the bar code scanner can be terminated in a short time. In this embodiment, a decoded output can often be obtained from the decoding circuit 17 by merely converging the accumulation time to a value close to the target value.

According to this embodiment as described above, since the sensitivity adjustment of the CCD sensor 4, i.e., the sensitivity of the bar code scanner, can be converged to an optimum value in a very short time, only a small number of scannings by the CCD sensor 4 is needed to obtain the optimum value of sensitivity. Thus, the operator is not made to feel irritable or uneasy.

Figure 3:
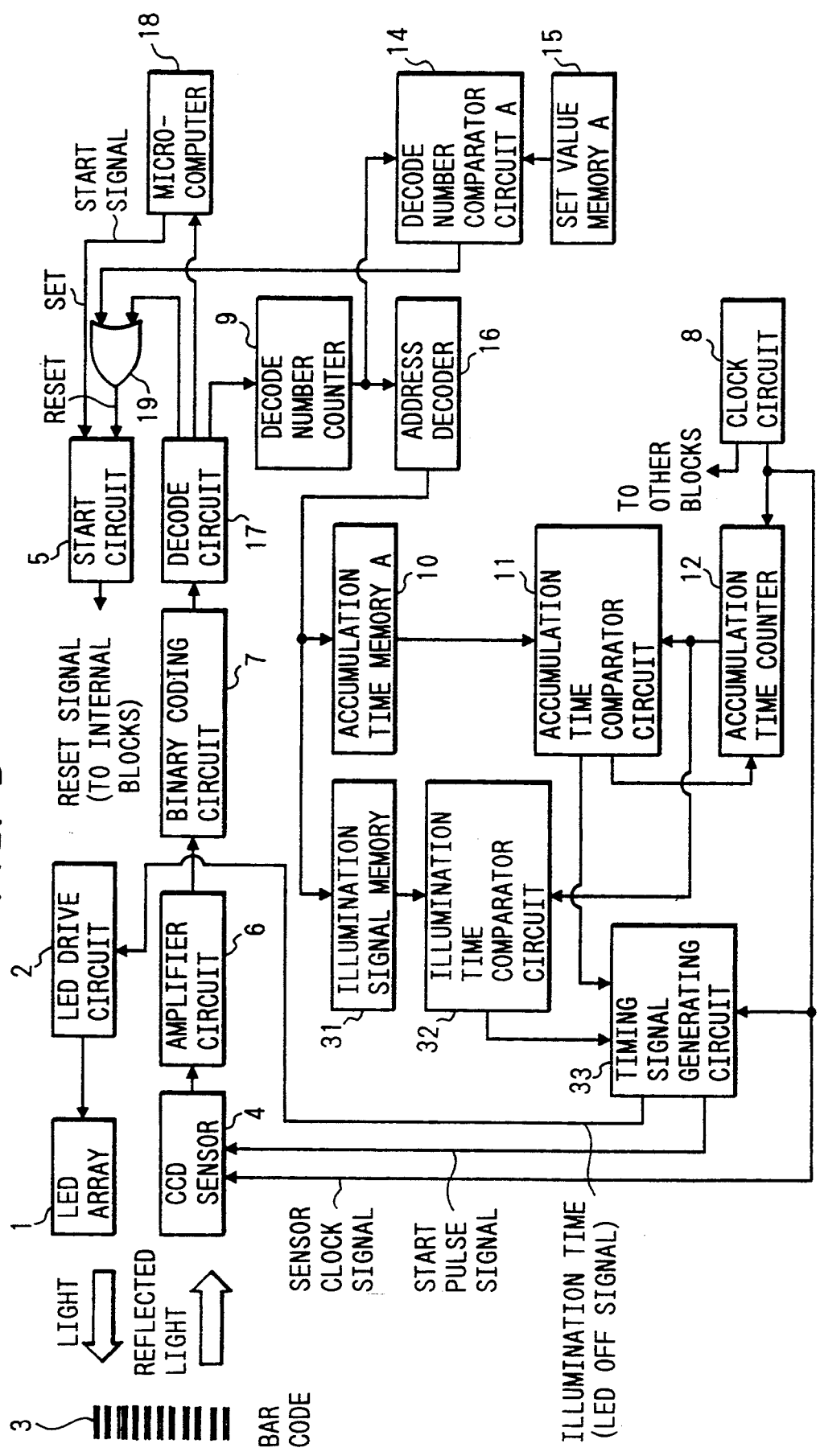
FIG. 3 is a block diagram illustrating a sensitivity adjustment circuit for a bar code scanner in accordance with a second embodiment of the present invention.

Next, a second embodiment will be explained with reference to FIG. 3. Components in FIG. 3 equivalent to those of the prior art shown in FIG. 4 are given the same reference numerals, and thus a repetitive explanation thereof is omitted.

The sensitivity adjustment circuit for a bar code scanner in accordance with the second embodiment comprises, as main components, the LED array 1 which forms a light emitting circuit; the LED drive circuit 2; the amplification circuit 6 which forms a signal processing circuit; the binarization circuit 7; the decoding circuit 17; the accumulation time comparison circuit 11 which forms a first comparison circuit; and a timing signal generating means 33 serving as both a first time setting circuit and a second time setting circuit.

The accumulated time memory 10 stores a plurality of sensor clock frequencies corresponding to the accumulation time of the CCD sensor 4 in such a way that each sensor clock frequency corresponds to each of respective addresses. An illumination time memory 31 also stores a plurality of sensor clock frequencies corresponding to the accumulation time of the CCD sensor 4 in such a manner as to correspond to respective addresses. The accumulation time comparison circuit 11 compares the sensor clock value of the accumulation time memory A10 which has been addressed with the accumulation time count value of the accumulation time counter 12. When the value of the former exceeds that of the latter, the accumulation time comparison circuit 11 outputs a first pulse signal, and at the same time supplies a reset signal to the accumulation time counter 12 so as to reset the count value thereof. An illumination time comparison circuit 32 compares the sensor clock value of the illumination time memory 31 which has been addressed with the accumulation time count value of the accumulation time counter 12, and similarly outputs a second pulse signal when the value of the former exceeds that of the latter. The accumulation time counter 12 counts sensor clock signals from the clock signal generating circuit 8. A timing signal generating circuit 33 generates a start pulse in response to the first pulse signal from the accumulation time comparison circuit 11, and the second time setting circuit generates an LED turning-off signal in response to the second pulse signal from the illumination time comparison circuit 32. A number of decodings comparison circuit A14 compares the decoding count value of the number of decodings counter 9 with the value of a set value memory A15. If these values are the same, the number of decodings comparison circuit A14 generates a termination signal. Constant values corresponding to the number of decodings have been stored in the set value memory A15. The address decoder 16 selects one of the stored values of the accumulation time memory A10 and the illumination time memory 31 on the basis of the decoding count value of the number of decodings counter 9. The decoding circuit 17 measures the pulse widths of the digital signals binarized by the binarization circuit 7, and decodes them into characters or numerical data corresponding to their pulse width combinations. The decoding circuit 17 supplies the characters or numerical data to the microcomputer 18, and outputs a decode NG signal when decoding fails. The microcomputer 18 operates to control the various sections of the bar code scanner, and the OR gate 19 supplies a reset signal to the start circuit 5.

Next, the operation of the sensitivity adjustment circuit of this embodiment will be explained.

Initially, when the bar code scanner is powered on, the microcomputer 18 supplies a set signal to the start circuit 5 and the start circuit 5 sends out a set signal in order to initialize the various sections of the bar code scanner to actuate them. In this condition, the clock signal generating circuit 8 sends out an operation clock signal to the various sections and supplies a sensor clock signal to the CCD sensor 4 and the accumulation time counter 12. The number of decodings counter 9 supplies an initial value (e.g., 0) of the decoding count value to the address decoder 16 which sets the addresses of the accumulation time memory A10 and the illumination time memory 31. The accumulation time memory A10 supplies a value (e.g., 100) corresponding to the set address to the accumulation time comparison circuit 11, and the illumination time memory 31 supplies a value (e.g., 200) corresponding to the set address to the illumination time comparison circuit 32. The accumulation time counter 12 has been counting input sensor clock signals, and supplies this accumulation time count value to the accumulation time comparison circuit 11 and the illumination time comparison circuit 32. When the accumulation time comparison circuit 11 detects that the accumulation time count value of the accumulation time counter 12 has exceeded a value (e.g., 100) corresponding to the above-mentioned address, it supplies a pulse signal to the timing signal generating circuit 33 and a reset signal to the accumulation time counter 12. At this time, in the timing signal generating circuit 33, the first time setting circuit, in response to the pulse signal, supplies a first start pulse to the CCD sensor 4. At the same time, the count value of the accumulation time counter 12 up to the present time is reset, and the accumulation time counter 12 starts to count sensor clock signals again.

When the first start pulse is supplied to the CCD sensor 4, the CCD sensor 4 reads the bar code 3 and outputs serial signals. These serial signals are clamped/inverted and amplified by the amplification circuit 6, converted into digital signals by the binarization circuit 7, and then decoded by the decoding circuit 17. However, since the serial signals obtained by reading the bar code 3 are those signals when the charge accumulation section of the CCD sensor 4 is not at all charged, the decoding circuit 17 cannot generate a proper decoded output in the output thereof and outputs only a decode NG signal. Next, this decode NG signal is supplied to the number of decodings counter 9 whose decoding count value is increased by one (e.g., to 1).

Hereinafter, in the same way as before, when the number of decodings counter 9 outputs the decoding count value (e.g., 1), the address decoder 16 sets the addresses of the accumulation time memory A10 and the illumination time memory 31, which addresses correspond to the decoding count value. The accumulated time memory 10 supplies a value (e.g., 2,500) corresponding to the set address to the accumulation time comparison circuit 11, and a value (e.g., 200) corresponding to the set address is supplied from the illumination time memory 31 to the illumination time comparison circuit 32. Next, when the illumination time comparison circuit 32 detects that the accumulation time count value of the accumulation time counter 12 has exceeded the value (e.g., 200) corresponding to the set address of the illumination time memory 31, it supplies a second pulse signal to the second time setting circuit of the timing signal generating circuit 33. Thereupon, the second time setting circuit of the timing signal generating circuit 33, in response to the second pulse signal, supplies an LED turning-off signal to the LED drive circuit 2. The LED drive circuit 2 receiving that signal stops the lighting of the LED array 1. On the other hand, as the accumulation time counter 12 still continues to count sensor clock signals, when the accumulation time comparison circuit 11 detects that the accumulation time count value has exceeded the value (e.g., 2,500) corresponding to the set address of the accumulation time memory A10, the accumulation time comparison circuit 11 supplies a pulse signal to the first time setting circuit of the timing signal generating circuit 33 and a reset signal to the accumulation time counter 12. Thereupon, the first time setting circuit of the timing signal generating circuit 33, in response to the pulse signal, supplies a second start pulse to the CCD sensor 4. The count value of the accumulation time counter 12 is reset because the reset signal is supplied, and the accumulation time counter 12 starts to count sensor clock signals again.

When the second start pulse is applied to the CCD sensor 4, the CCD sensor 4 reads the bar code 3 and outputs serial signals in the same way as before. These serial signals are amplified by the amplification circuit 6, converted into digital signals by the binarization circuit 7, and then decoded by the decoding circuit 17. Since the serial signals obtained by reading the bar code 3 are generated by the discharging of charge accumulated in the charge accumulation section of the CCD sensor 4, at this time also, the decoding circuit 17 cannot generate a proper decoded output in the output thereof and generates only a decode NG signal. Then, this decode NG signal increases the decoding count value of the number of decodings counter 9 by one once more (e.g., to 2).

The operations to be performed hereinafter are the same as in the previous case. The number of decodings counter 9 outputs the decoding count value (e.g., 2), and the address decoder 16 sets the addresses of the accumulation time memory A10 and the illumination time memory 31, which addresses correspond to the decoding count value. The accumulation time memory A10 supplies a value (e.g., 2,500) corresponding to the set address to the accumulation time comparison circuit 11, and the illumination time memory 31 supplies a value (e.g., 400) corresponding to the set address to the illumination time comparison circuit 32. The illumination time comparison circuit 32 generates a second pulse signal when it detects that the accumulation time count value of the accumulation time counter 12 has exceeded the value (e.g., 400) corresponding to the set address. The accumulation time comparison circuit 11 generates a pulse signal and a reset signal when it detects that the accumulation time count value has exceeded the value (e.g., 2,500) corresponding to the set address. The timing signal generating circuit 13 generates an LED turning-off signal when the second time setting circuit thereof responds to the second pulse signal. The LED drive circuit 2 receiving this signal stops the lighting of the LED array 1, and the first time setting circuit generates a third start pulse in response to the pulse signal.

In addition, when a third start pulse is applied to CCD sensor 4, the CCD sensor 4 reads the bar code 3 as in the previous case and outputs serial signals. These serial signals are clamped/inverted and amplified by the amplification circuit 6, converted into digital signals by the binarization circuit 7, and then decoded by the decoding circuit 17. In this case, the serial signals obtained by reading the bar code 3 at this time have been obtained by at least properly reading the bar code 3. However, if the setting of the photoreception sensitivity of the CCD sensor 4 is still insufficient in this reading, the decoding circuit 17 cannot generate a proper decoded output at this time also, and therefore generates only a decode NG signal in the same manner as before. Next, this decode NG signal is supplied again to the number of decodings counter 9, the decoding count value thereof being increased further by one (e.g., to 3).

Hereinafter, similarly to that described above, each the a decode NG signal is generated from the decoding circuit 17, the decoding count value of the number of decodings counter 9 is increased by one. The addresses of the accumulation time memory A10 and the illumination time memory 31 are changed in accordance with an increase in the decoding count value. The accumulation time of the CCD sensor 4 and the lighting time of the LED array 1 are adjusted in accordance with the changing of these set addresses. In this way, the photoreception sensitivity of the CCD sensor 4, that is, the sensitivity of the bar code scanner, is adjusted.

When a proper (optimum) decoded signal is produced in the output of the decoding circuit 17 during the series of operations, since hereinafter a decode NG signal will no longer supplied to the number of decodings counter 9, the set addresses of the accumulation time memory A10 and the illumination time memory 31 are not changed. Therefore, as the counting termination value of the sensor clock signals of the accumulation time counter 12, the accumulation time of the CCD sensor 4 and the lighting time of the LED array 1 become constant, the accumulation time of the CCD sensor 4 and the lighting time of the LED array 1 become constant. As a result, the CCD sensor 4 is adjusted to the photoreception sensitivity corresponding to the accumulation time and the lighting time.

According to this embodiment as described above, photoreception sensitivity of the CCD sensor 4 is adjusted substantially by a combination of adjustment of the accumulation time of the CCD sensor 4 and the adjustment of the lighting time of the LED array 1, thereby adjusting the sensitivity of the bar code scanner. Therefore, a sufficient photoreception sensitivity range can be obtained. In addition, the number of components is not increased or the present invention is not expensive to perform sensitivity adjustment of the bar code scanner.

Although in the above-described embodiments a case in which a CCD sensor is used as a line type sensor has been explained, the present invention is not limited to this case, but can be applied to a line type sensor in which MOS type semiconductors are used.

According to the present invention, as described above, since the lighting time of the LED array 1 is controlled within each accumulation time set in the line type sensor, an advantage can be obtained in that a bar code scanner sensitivity adjustment range can be secured satisfactorily by changing the accumulation time of the sensor and by controlling the lighting time of the LED array 1.

Another advantage is that only one addition of switching element, such as a transistor, is required to control the lighting time of the LED array 1, there is hardly any need to increase the number of components, and the present invention can be constructed at a low cost.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A sensitivity adjustment circuit for a bar code scanner in which a plurality of photoreceptor elements whose amount of charge accumulated varies in accordance with the intensity of light are arrayed linearly, said bar code scanner reading bar codes formed of an array of black bars and white spaces by means of sensor means which outputs information on the amount of charge accumulated at predetermined times, said bar code scanner comprising:

- peak hold means for holding a peak value of output signals from said sensor means;
- analog to digital conversion means for converting a peak value of said output signals held by said peak hold means into a peak digital value;
- a target value memory for storing target value data of the peak value of said output signals held by said peak hold means beforehand;
- a previous accumulation time memory for storing data on time in which charge has been accumulated by said sensor means;
- multiplying means for multiplying the target value data of said target value memory by data on time in which charge has been accumulated by said sensor means;
- division means for dividing a value multiplied by said multiplying means by said peak digital value; and
- charge accumulation time control means for controlling the next time in which charge is accumulated by said sensor means on the basis of the divided value of said division means.

2. A sensitivity adjustment circuit according to claim 1, wherein divided values of said division means are stored in the previous accumulation time memory.

3. A sensitivity adjustment circuit according to claim 1, wherein said peak hold means holds the peak value of signals output from said sensor means, which signals corresponding to space portions of bar codes.

4. A sensitivity adjustment circuit according to claim 1, wherein said accumulation time control means comprises clock signal generating means; an accumulation time counter for counting clock signals from the clock signal generating means; accumulation time comparison means for comparing the count value of said accumulation time counter with the divided value of said division means and generating a pulse signal when the value of the former exceeds the value of the latter; and timing signal generating means for outputting a start signal for prompting said sensor means to output accumulation amount information in response to a pulse signal from said accumulation time comparison means.

5. A method for adjusting sensitivity of a bar code scanner in which a plurality of photoreceptor elements whose amount of charge accumulated varies in accordance with the intensity of light are arrayed linearly, said bar code scanner reading bar codes formed of an array of black bars and white spaces by means of sensor means which outputs information on the amount of charge accumulated at predetermined times, said bar code scanner comprising the steps of:

- holding a peak value of output signals from the sensor means;
- converting said held peak value into a digital value;
- multiplying a preset target value of the peak value of said output signals by data on time in which charge has been accumulated by said sensor means;
- dividing said multiplied result by a digital value of said held peak value; and
- setting time in which charge is accumulated by said sensor means on the basis of said divided result.

6. A sensitivity adjustment circuit for a bar code scanner, comprising: a light emitting circuit for illuminating bar codes; line type sensor means for reading bar codes; a signal processing circuit for decoding signals output from said sensor means and outputting a decode Not-Good signal when it is impossible to decode; a decode Not-Good signal counter for counting the number of times the decode Not-Good signal has been output; an accumulation time memory which is addressed by the count value of said decode Not-Good signal; a clock counter for counting clock signals; a comparison circuit for comparing a value output from said accumulation time memory with the count value of said clock counter; a time setting circuit for setting the accumulation time of said sensor means in response to an output from said comparison circuit, wherein the accumulation time of said sensor means is set in accordance with a value output from said accumulation time memory when a decoded output is obtained from said signal processing circuit, said sensitivity adjustment circuit further comprising:

- an illumination time memory which is addressed by a count value of said decode Not-Good signal counter;
- a second comparison circuit for comparing a value output from said illumination time memory with the count value of said clock counter;
- a second time setting circuit for setting lighting time of said light emitting circuit in response to an output from said second comparison circuit; and
- means for controlling lighting time of said light emitting circuit on the basis of an output from said second time setting circuit.

7. A sensitivity adjustment circuit according to claim 6, wherein a value output from said illumination time memory is equal to or greater than a value output from said accumulation time memory.

* * * * *